United States Patent [19]
Joly

[11] Patent Number: 5,975,959
[45] Date of Patent: Nov. 2, 1999

[54] SMART CARD CONNECTOR MODULE

[75] Inventor: Jean Claude Joly, Osny, France

[73] Assignee: The Whitaker Corporation, Wilmington, Del.

[21] Appl. No.: 08/976,590

[22] Filed: Nov. 24, 1997

[30] Foreign Application Priority Data

Dec. 17, 1996 [FR] France ................................. 96402775

[51] Int. Cl.⁶ .................................................. H01R 23/70
[52] U.S. Cl. ............................................ 439/630; 439/885
[58] Field of Search ........................... 439/630, 59, 325, 439/377, 629, 626, 885, 66

[56] References Cited

U.S. PATENT DOCUMENTS

| | | | |
|---|---|---|---|
| 3,954,317 | 5/1976 | Gilissen et al. | 439/591 |
| 4,402,562 | 9/1983 | Sado | 439/91 |
| 4,442,594 | 4/1984 | Narozny | 29/884 |
| 4,689,023 | 8/1987 | Strong, III et al. | 439/189 |
| 4,708,415 | 11/1987 | White | 439/633 |
| 4,869,672 | 9/1989 | Andrews, Jr. | 439/60 |
| 4,895,536 | 1/1990 | Gingerich et al. | 439/885 |
| 4,975,086 | 12/1990 | Reichardt et al. | 439/629 |
| 5,173,055 | 12/1992 | Grabbe | 439/66 |
| 5,259,777 | 11/1993 | Schuder et al. | 439/188 |
| 5,324,205 | 6/1994 | Ahmad et al. | 439/66 |
| 5,395,252 | 3/1995 | White | 439/66 |
| 5,462,440 | 10/1995 | Rothenberger | 439/66 |
| 5,466,161 | 11/1995 | Yumibe et al. | 439/66 |
| 5,746,607 | 5/1998 | Bricaud et al. | 439/66 |
| 5,775,929 | 7/1998 | Hashiguchi | 439/260 |
| 5,800,200 | 9/1998 | Brioaud et al. | 439/404 |

FOREIGN PATENT DOCUMENTS

| | | | |
|---|---|---|---|
| 350 710-A | 1/1990 | European Pat. Off. | 439/630 |
| 0 590 644-A1 | 4/1994 | European Pat. Off. | H01R 43/24 |
| 43 44 272-A1 | 6/1994 | Germany | H01R 13/24 |
| 0098079 | 4/1990 | Japan | 439/629 |

*Primary Examiner*—Neil Abrams
*Assistant Examiner*—Michael C Zarroli
*Attorney, Agent, or Firm*—Driscoll A. Nina, Jr.

[57] ABSTRACT

A smart card connector module comprises two rows of terminals stamped and formed from a single piece of sheet metal and interconnected by a carrier strip. An insulative housing may either be overmoulded or assembled to the carrier strip, the terminals subsequently being electrically disconnected by stamping away portions of the carrier strip through windows provided in the housing.

10 Claims, 2 Drawing Sheets

SMART CARD CONNECTOR MODULE

BACKGROUND OF THE INVENTION

Field of the Invention

This invention relates to a connector module for connection to contact pads of a smart card, the connector in the form of a module for mounting on a printed circuit board for example.

Description of the Prior Art

Cards with in-built integrated circuits are used in a wide variety of systems, such as pay phones, electronic cash cards, and as memory modules, many of these cards commonly called "Smart Cards". Typical Smart Cards have a number of contact pads, for example 6–8, arranged in two rows for connection to contacts biased against the pads, whereby the contacts form part of a connector often mounted on a printed circuit board of an electronic apparatus. There is a continuous demand to reduce the size of electrical and electronic components, and also to reduce their cost.

A major component of manufacturing costs is often related to the number of manufacturing and assembly operations, the latter being particularly time consuming.

SUMMARY OF THE INVENTION

It is therefore an object of this invention to provide a compact, reliable, Smart Card connector that is cost-effective to produce, particularly in large quantities. It would be further advantageous if such connector would be well adapted for rapid automated assembly on a printed circuit board.

Objects of this invention have been achieved by providing the smart card connector module according to claim 1. In particular, a smart card connector module is provided comprising an insulative housing and terminals mounted therein and arranged in pairs disposed in a juxtaposed manner to form at least one row, each pair comprising a connection terminal and a smart card terminal electrically interconnected thereto, the smart card terminal comprising a spring arm and contact portion protruding beyond an upper surface of the housing for resiliently biasing against a contact pad of the smart card, the row of terminals of the module being stamped and formed from sheet metal where the terminals are interconnected to each other by a carrier strip during manufacturing wherein the housing comprises windows above the carrier strip for passage of a cutting die therethrough to remove portions of the carrier strip such that adjacent terminal pairs viewed in the direction of the carrier strip are electrically separated.

Advantageously therefore a smart card connector module is provided that is compact, reliable, and particularly cost-effective to produce in large quantities. Forming of the contacts from a strip of sheet metal, subsequently mounting the housing of the whole module to the strip, and then cutting away the interconnecting portions allows for the modules to be produced at high speed in high volumes with few manufacturing steps. Two rows of terminals can be formed from the same piece of sheet metal, one either side of the carrier strip, for a particularly advantageous low cost and compact module.

Further advantageous features of this invention will be apparent from the following description, drawings and claims.

DETAILED DESCRIPTION OF THE PREFERRED EMBODIMENT

Figure 1:
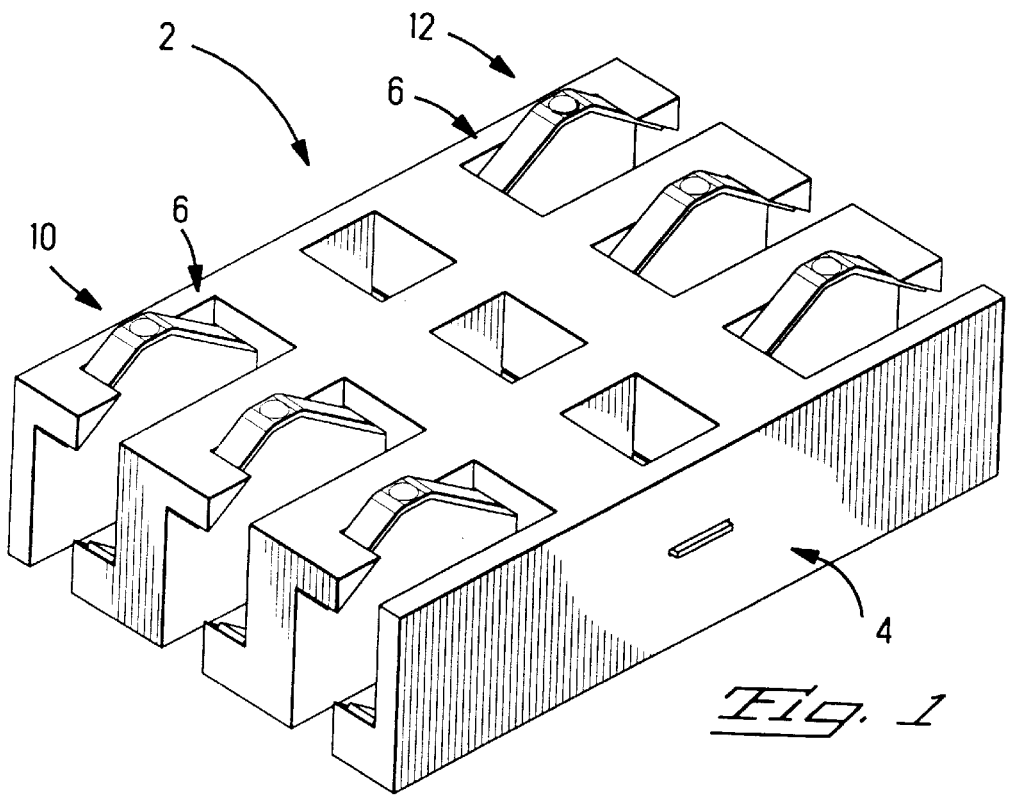
FIG. 1 is a perspective view of a connector module according to this invention.

Referring to the figures, a smart card connector module 2 comprises an insulative housing 4 and a plurality of smart card terminals 6 and connection terminals 8 arranged in two parallel rows 10,12. The connection terminals 8 and smart card terminals 6 of both rows 10,12 are stamped and formed from a single sheet of metal, and interconnected together by a carrier strip 14 positioned symmetrically between the rows 10,12 during the stamping and forming process. The carrier strip 14 is provided with a plurality of pilot holes 16 for positioning, guiding and moving the carrier strip during the stamping and forming process, as is typical with conventional stamping and forming processes.

The smart card terminals and connection terminals 6,8 are arranged in pairs 18 extending from the carrier strip 14 at attachment portions 20 where attachment ends 22,23 of the connection and smart card terminals respectively extend, the terminals being arranged adjacent each other in a juxtaposed manner in the direction D of the carrier strip 14. The smart card terminals each comprise a cantilever spring arm 26 extending from the attachment end 23 obliquely outwardly from the plane of the carrier strip 14 (i.e. a plane defined by the upper surface 15 of the carrier strip), the spring arm 26 extending to a contact portion 28 proximate a free end 30 of the terminal. The contact portion 28 comprises a contact protrusion 32 for biasing against a contact pad of a smart card (not shown). The free end 30 extends obliquely away from the contact protrusion 32, towards the plane 15 of the carrier strip 14.

The connection terminals 8 are constructed in a similar manner to the smart card terminal 6 and each comprises a spring arm 34 extending obliquely from the attachment end 22 below the carrier strip 14 with relation to the smart card terminal, further comprising a contact portion 36 proximate a free-end 38 which extends obliquely therefrom back towards the plane 15 of the carrier strip. The connection terminal 8 in this embodiment is constructed as a terminal that resiliently biases against complementary pads of a printed circuit board, for example, during assembly of the module to the printed circuit board, but a more permanent connection may be affected by subsequently soldering the contact portion 36 to the printed circuit board. The resilient arm 34 of the connection terminal 8 ensures that manufacturing tolerances, or slight non-planarity of the PCB can be absorbed, thereby ensuring an effective subsequent solder connection. It would however be possible to provide the connection terminals 8 with pin contacts or non-resilient surface mount pads commonly found on conventional connectors for mounting to printed circuit boards. The provision of the resilient arm 34 in order to bias the contact pads 36 is however found to be advantageous because of the absorption of tolerances and the provision of a certain contact force prior to soldering in order to ensure a particular effective solder connection.

Between the pairs 18 in the direction D of the carrier strip 14, are intermediate linking portions 17 such that the carrier strip is continuous and supports a plurality of juxtaposed pairs 18 during the manufacturing process. Forming all of the terminals from a single sheet enables particularly rapid, automated, cost-effective manufacturing thereof, in a compact embodiment with low material usage.

Figure 4:
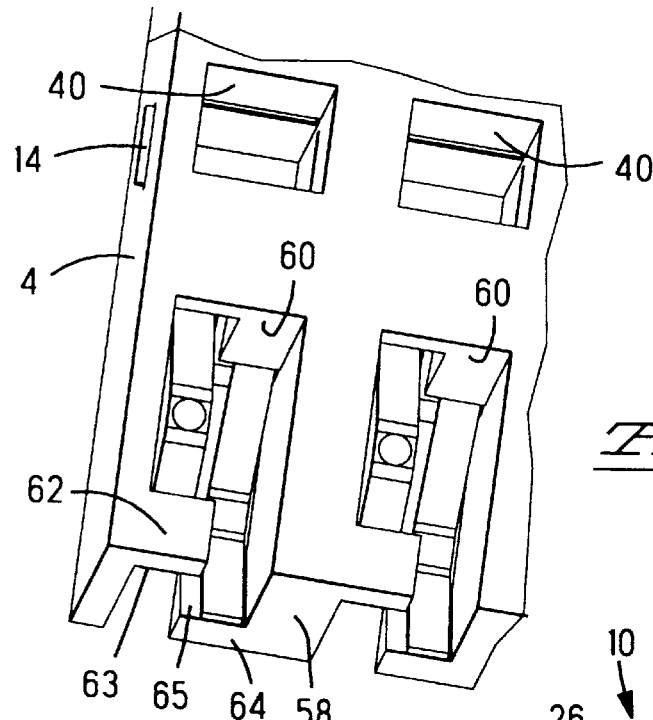
FIG. 4 is a detailed perspective view of a portion of the module.
Figure 5:
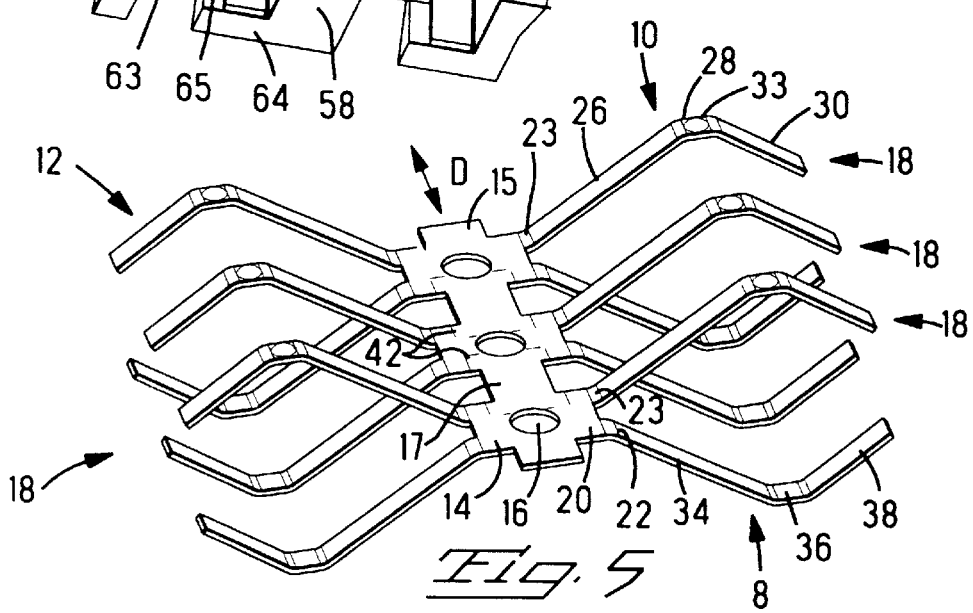
FIG. 5 is a perspective view of contacts of the module interconnected to a carrier strip, prior to overmoulding.

The terminals and carrier strip 6,8,14 can be assembled to the housing in a number of manners. In a first embodiment, the terminals and carrier strip can be continuously overmoulded by the insulative housing 4. The insulative housing may be moulded in a continuous process about the continuous carrier strip 14, the carrier strip subsequently being severed with the housing to provide a module with a plurality of opposed terminal pairs 18, the module being cut to the desired length (i.e. number of terminal pairs). In the embodiments shown, three juxtaposed pairs of terminals are provided although certain memory cards may require for example four or more pairs in either row 10,12. After overmoulding, the attachment portions 20 and attachment ends 22 of the terminals are securely held within the housing. The linking portions 17 are then cut away by a stamping tool that punches through corresponding windows 40 provided in the housing 4 at the corresponding position above the carrier strip 14 as best seen in FIG. 4. The stamping die cuts beyond the linking portions along the cut lines 42 as best seen in FIG. 5 such that the terminal pairs 18 in the opposed rows 10,12 are electrically disconnected from each other. The only electrical connection remaining is thus between smart card and connection terminals 6,8 of a same pair 18, via their attachment portion 20 left over from the carrier strip 14. The continuous formation, moulding, and stamping of the modules enables a particularly cost-effective manufacturing process, especially where high volumes are concerned, because the number of assembly operations are simplified and reduced.

Figure 2:
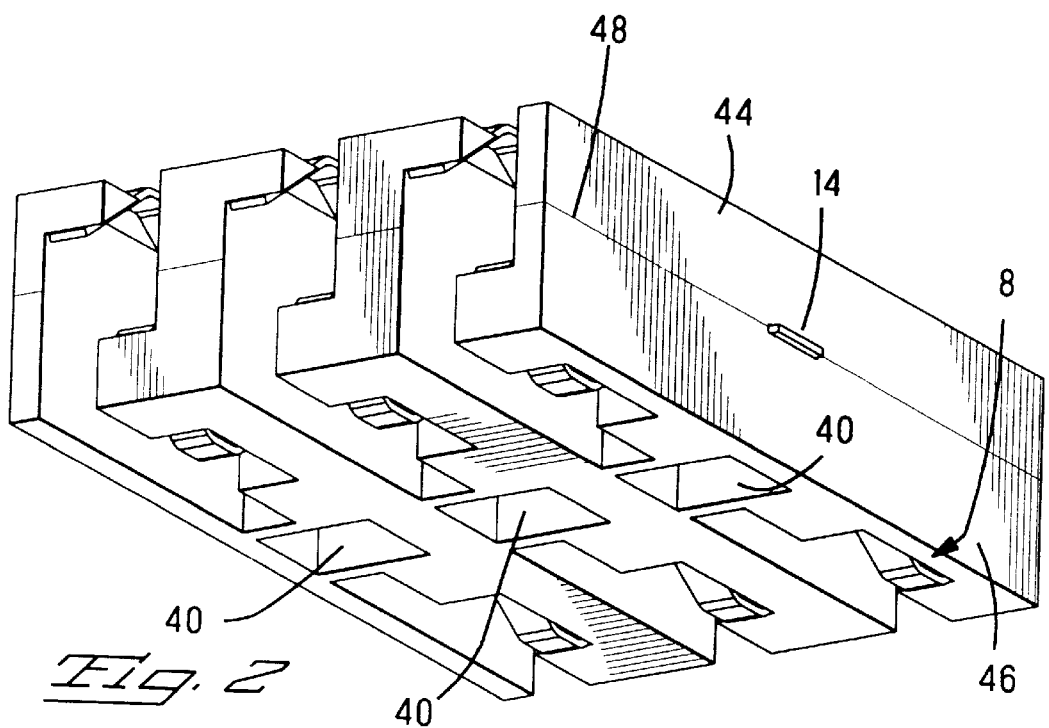
FIG. 2 is a perspective view of the module of FIG. 1 looking towards a bottom face.

A number of variants in the manufacturing process may be provided. One particularly advantageous process would be the provision of the housing 4 in two separate parts 44,46 having their joining interfaces 48 situated at the plane 15 of the carrier strip 14, as best seen in FIG. 2. In the latter embodiment, the housing parts 44,46 can be moulded in separate operations, the housing parts then being assembled from either side of the carrier strip 14 and bonded together by any conventional bonding technique, such as ultrasonic welding, heat staking, use of adhesives and the like. It could also be imagined that the housing parts 44,46 are held together by interfering retention means projecting from the housings and received in complementary cavities, or by the provision of latches, whereby the terminal mounting portions 20 would be provided with stamped and formed stakes for securely lodging the mounting portions in the housing parts to ensure a secure attachment of the mounting portions to the housing. The mounting portions 20 need to be sufficiently securely mounted with respect to the spring forces of the spring arms 34,26. Rather than providing the housing 4 in a continuous moulding, it is also possible to overmould the housing 4 for each individual module, or to provide housing parts 44,46 as separate parts for each module.

Figure 3:
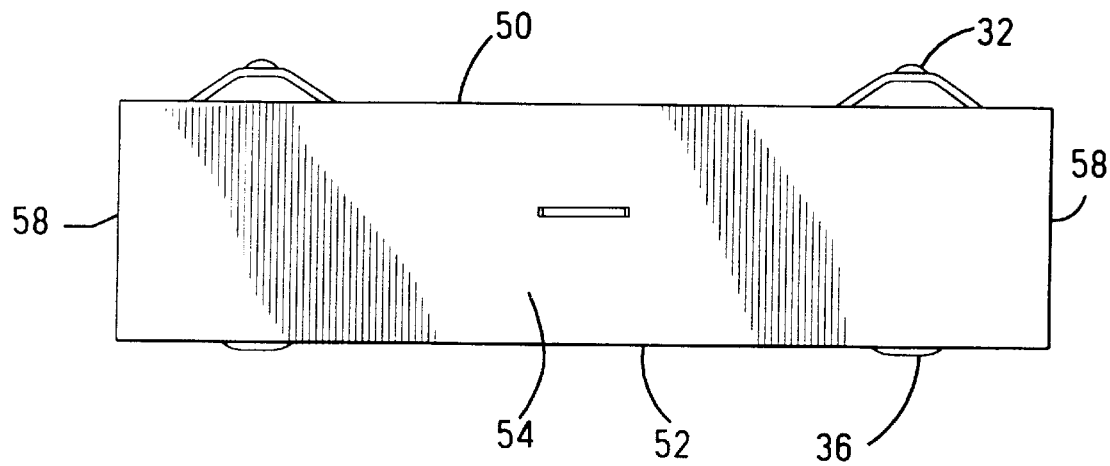
FIG. 3 is a side plan view of the module.

As best seen in FIG. 3, the contact protrusions 32 of the smart card terminals 26 protrude beyond a substantially planar upper surface 50 of the housing, an opposed side of the housing is bounded by a lower surface 52 parallel to the upper surface 50, beyond which the contact portions 36 of the connection terminals 8 protrude, in this embodiment for biasing against circuit pads of a printed circuit board. The housing 4 is bounded by end walls 54,56 transverse, or orthogonal to the direction D of the carrier of the carrier strip 14 where a severed end 56 of the carrier strip 14 can be seen. The severed end 56 results from the manufacturing process described above. The free ends 30 of both rows 10,12 of terminals 6,8 are positioned respectively proximate opposed side surfaces 58 of the housing.

As seen in FIGS. 1,2 and 4, the contact portions 28,36 and part of the free ends 30,38 of the terminals are positioned within windows 60 of the housing that enable access of the contact portions through the upper and lower surfaces 50,52 respectively. Between the contact portion window 60 and side surface 58 are housing portions 62,64 overlapping the terminal free ends 30,38 respectively in order to provide shoulders 63,65 respectively against which the terminal free ends abut. The shoulders 63,65 may serve to resiliently bias the terminals such that they are in a pre-stressed arrangement prior to connection to: a printed circuit board concerning the connection terminals 8; or connection to a smart card concerning the smart card terminals 6. In this manner a high and defined contact force can be provided. The shoulders 63,65 also serve to protect the terminals during handling of the connector from damage by being caught on external objects. Pre-stressing of the terminals is easily effected where the housing is provided in two parts 44,46 that are assembled together on either side of the carrier strip 14 as shown in FIG. 2, the housing shoulders 63,65 inwardly biasing the contacts during the assembly process, for example. It is possible to pre-stress the smart card terminal 6 to a different degree to the connection terminals 8, which for example may not be pre-stressed at all, especially for terminals that are subsequently soldered to a PCB.

I claim:

1. A connector module for connection to contact pads of a smart card, the module comprising an insulative housing and terminals mounted therein and arranged in pairs disposed in a juxtaposed manner to form at least one row extending in a carrier direction, each pair comprising a connection terminal and a smart card terminal electrically interconnected thereto, the smart card terminal comprising a spring arm and contact portion extending therefrom and protruding beyond an upper surface of the housing for resiliently biasing against a contact pad of the smart card, the row of terminals of the module being stamped and formed from a single piece of sheet metal where the terminals are interconnected to each other by a carrier strip located along the terminal between the connection terminal and the smart card terminal contact portion during manufacturing, wherein the housing comprises windows above the carrier strip for passage of a cutting die therethrough to remove portions of the carrier strip such that adjacent terminal pairs viewed in the direction of the carrier strip are electrically separated.

2. The module according to claim 1 wherein there are two terminal rows, one either side of the carrier strip, formed from the same piece of sheet metal.

3. The module according to claim 2 wherein the rows of terminals are disposed in mirror image symmetry about the carrier strip.

4. The module according to claim 1 wherein the smart card terminals each comprise a cantilever spring arm extending from an attachment end at an attachment portion of the carrier strip.

5. The module according to claim 4 wherein the connection terminals also extend from the attachment portions of the carrier strip.

6. The module according to claim 1 wherein the smart card terminal and connection terminal of each pair, are arranged adjacent each other in the carrier direction.

7. The module according to claim 1 wherein the smart card terminals extend obliquely away from a plane of the carrier strip.

8. The module according to claim 7 wherein the connection terminals extend obliquely away from the plane of the carrier strip, on an opposed side to the smart card terminals.

9. The module according to claim 1 wherein the smart card and/or connection terminals are pre-stressed by abutment in a resilient manner against shoulders of the housing.

10. The module according to claim 9 wherein the smart card terminals each comprise free ends extending from their contact portions, each free end engaging the shoulder of the housing for pre-stressing the contact.

* * * * *